US009811857B2

(12) United States Patent
Jasko et al.

(10) Patent No.: US 9,811,857 B2
(45) Date of Patent: Nov. 7, 2017

(54) DOCUMENT CALCULATOR

(71) Applicant: Bank of America Corporation, Charlotte, NC (US)

(72) Inventors: Christina Jasko, Allendale, NJ (US); Brandon Kane, Philadelphia, PA (US); Albert R. Lupcho, III, Jacksonville, FL (US); Arvind Srinivasan Ramakrishnan, West Windsor, NJ (US); Kelly Ur, East Brunswick, NJ (US); Jill Weber, Chatham, NJ (US); John J. Wilson, Madison, NJ (US)

(73) Assignee: Bank of America Corporation, Charlotte, NC (US)

( * ) Notice: Subject to any disclaimer, the term of this patent is extended or adjusted under 35 U.S.C. 154(b) by 387 days.

(21) Appl. No.: 14/227,882

(22) Filed: Mar. 27, 2014

(65) Prior Publication Data

US 2015/0278939 A1    Oct. 1, 2015

(51) Int. Cl.
*G06Q 40/00*   (2012.01)
*G06Q 40/02*   (2012.01)

(52) U.S. Cl.
CPC .................... *G06Q 40/02* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | | |
|---|---|---|---|---|
| 5,339,412 A * | 8/1994 | Fueki | ................ | G06F 17/30011 |
| 5,875,437 A | 2/1999 | Atkins | | |
| 7,694,875 B2 * | 4/2010 | Mitamura | ........... | G06F 3/03545 |
| | | | | 235/375 |
| 7,849,003 B2 | 12/2010 | Egnatios et al. | | |
| 7,925,579 B1 * | 4/2011 | Flaxman | ................ | G06Q 40/00 |
| | | | | 705/35 |
| 8,280,794 B1 | 10/2012 | Variankaval et al. | | |
| 8,320,665 B2 * | 11/2012 | Puneet | ..................... | G06K 9/38 |
| | | | | 382/164 |
| 8,321,310 B1 | 11/2012 | Keld et al. | | |
| 8,412,607 B2 | 4/2013 | Variankaval et al. | | |
| 8,423,447 B2 | 4/2013 | Treacy et al. | | |
| 8,452,623 B2 | 5/2013 | Pendergrass et al. | | |
| 8,484,109 B1 | 7/2013 | Nelson Deurmier et al. | | |

(Continued)

*Primary Examiner* — Frantzy Poinvil
(74) *Attorney, Agent, or Firm* — Banner & Witcoff, Ltd.; Michael A. Springs

(57) ABSTRACT

A customer may desire to enroll in a transaction, such as a product or a service, offered, managed, and/or owned by an institution, such as a financial institution. The customer may attempt to directly enroll in the product or service or may enroll in the product or service through an agent of the institution. The customer and/or agent may select the product or service (e.g., via a workstation or other device), and a computing device may determine which documents the product or service uses, which documents the customer has on file already, and/or which documents the customer is missing. The computing device may cause the customer and/or agent to be notified of the missing documents. When the customer and/or agent provides all of the documents for the product or service (or an exception applies to one or more missing documents), the computing system may enroll the customer in the selected product or service.

20 Claims, 12 Drawing Sheets

(56) References Cited

U.S. PATENT DOCUMENTS

| | | | |
|---|---|---|---|
| 8,489,498 B1 * | 7/2013 | Flaxman | G06Q 40/00 |
| | | | 705/35 |
| 8,498,915 B2 | 7/2013 | Eder | |
| 8,517,258 B2 | 8/2013 | Taylor et al. | |
| 8,543,490 B2 | 9/2013 | Lerner | |
| 8,566,212 B2 | 10/2013 | Lutnick et al. | |
| 8,572,072 B1 | 10/2013 | Roumeliotis | |
| 8,600,985 B2 | 12/2013 | Chen et al. | |
| 2002/0019791 A1 | 2/2002 | Goss et al. | |
| 2003/0110117 A1 | 6/2003 | Saidenberg et al. | |
| 2004/0064432 A1 * | 4/2004 | Oetringer | G06F 17/30011 |
| 2008/0022128 A1 * | 1/2008 | Proudler | G06F 21/84 |
| | | | 713/189 |
| 2008/0256105 A1 * | 10/2008 | Nogawa | G06F 21/64 |
| 2012/0310692 A1 | 12/2012 | Maiya et al. | |
| 2013/0030923 A1 | 1/2013 | Carroll et al. | |
| 2013/0339207 A1 | 12/2013 | Avery | |
| 2013/0339208 A1 | 12/2013 | Avery | |

* cited by examiner

| <Institution Logo> | Workspace | My Settings | Locate your Specialist | Help |

Complete Product or Service Details

<Customer Name>

<Customer Contact Info>

<Product or Service Details>

⋮

Generate Documents ☒

Select documents to generate. On file?

<Customer Name>
☑ Document A Yes
<Product or Service Name>

Account 1: <XXXXXXXX1 (TYPE) "nickname">
☐ Document B* Yes
☐ Document C° Yes
☑ Document D No Account 2: <XXXXXXXX2 (TYPE) "nickname">
☐ Document B* Yes
☐ Document C° Yes
☑ Document E No Select Missing | Select All | Deselect All Cancel | Generate Selected — 930

Generate Documents | Final Review
                910

FIG. 9

Document D

<Text of Document>
•
•
•
<Text of Document>

| Address | | | |
|---|---|---|---|
| Street | City | State | Zip |
| <House No./Street Name> | <XX> | <XX> | <XXXXX> |

| Acknowledgment | |
|---|---|
| Printed Name | Title |
| <Customer Name> | <Customer Title> |
| Signature | Date |

FIG. 10A

Document E

<Text of Document>
•
•
•
<Text of Document>

| Address | | | |
|---|---|---|---|
| Street | City | State | Zip |

| Acknowledgment | |
|---|---|
| Printed Name | Title |
| Signature | Date |

FIG. 10B

<Institution Logo> | Workspace | My Settings | Locate your Specialist | Help

Complete Product or Service Details

<Customer Name>

<Customer Contact Info>

<Product or Service Details>

⋮

Send Documents for Signature [x]

<Customer Name>

☑ Document A
Send to: <Customer_Email_Address>
<Customer Name> <Customer_User_ID>

<Product or Service Name>

Account 1: <XXXXXXXX1 (TYPE) "nickname">
☑ Document D
Send to: <Customer_Email_Address>
<Customer Name> <Customer_User_ID>

Account 2: <XXXXXXXX2 (TYPE) "nickname">
☑ Document E
Send to: <Customer Name>
<Customer_Mailing_Address>

[Cancel] [Send for Signature] — 1120, 1130

[Send for Signature] [Generate Documents] [Close] — 1110

FIG. 11

| <Institution Logo> | Workspace | My Settings \| Locate your Specialist \| Help |

Complete Product or Service Details

Send Documents for Signature Confirmation ☒

The following signature request has been sent.
<Customer_Name>

<Customer Name>

<Customer Contact Info>

☑ Document A
Sent to: <Customer_Email_Address>
       <Customer_Name> <Customer_User_ID>

<Product or Service Name>

<Product or Service Details>

Account 1: <XXXXXXXX1 (TYPE) "nickname">
☑ Document D
Sent to: <Customer_Email_Address>
       <Customer_Name> <Customer_User_ID>

Account 2: <XXXXXXXX2 (TYPE) "nickname">
☑ Document E
Sent to: <Customer_Mailing_Address>

⋮

OK

Send for Signature   Generate Documents   Close

FIG. 12

DOCUMENT CALCULATOR

TECHNICAL FIELD

One or more aspects of the disclosure generally relate to computing devices, computing systems, and computer software. In particular, one or more aspects of the disclosure generally relate to computing devices, computing systems, and computer software that may be used by an institution, such as a financial institution or other entity, to track documents for products and/or services.

BACKGROUND

When a customer wants to enroll in a new product or service offered by an institution, such as a financial institution, the customer may be required to sign and/or to give one or more documents to the institution. Oftentimes, the customer may work with an agent of the institution, such as a financial advisor, to determine the appropriate documents. If the financial advisor does not immediately know which documents are required, the financial advisor may have to refer to a manual explaining policies and procedures to identify the documents. If the manual is not updated and/or the financial advisor misses a document requirement, the customer might have to return to the institution multiple times to enroll in the product or service, inconveniencing the customer.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system and method of receiving a request to enroll a user, such as a customer, in a product or service provided by an institution. The method may include determining, by a computing device, a document used for the product or service and/or determining whether the user has the document used for the product or service on file with the institution. If the user does not have the document used for the product or service on file with the institution, a status identifier for the document may be generated. The status identifier may indicate, for example, that the user is missing the document.

The method may also include generating a display, such as a graphical user interface, indicating that the user is missing the document and an option to send the document to the user. If the option to send the document to the user is selected (such as by an agent of the institution), the document may be sent to the user.

In some aspects, the method may include receiving the document from the user or an agent of the institution after the status identifier for the document is generated. In response to receiving the document, the status identifier for the document may be changed to indicate that the user has the document on file. Furthermore, the product or service provided by the institution may use a plurality of documents, including the first document. The method may further include determining that the user has the plurality of documents for the product or service on file with the institution. In response to this determination, the user may be enrolled in the product or service.

The method may also include determining a second document used for the product or service and/or determining whether the user has the second document used for the product or service on file with the institution. If the user has the second document used for the product or service on file with the institution, a second status identifier for the second document may be generated. The second status identifier may indicate, for example, that the user has the second document on file.

In some aspects, the document may comprise a first document, and the method may further include comparing a second document on file for the user to the first document. Based on the comparison, it may be determined whether the second document is equivalent to the first document. If the second document is equivalent to the first document, the status identifier for the first document may be changed to indicate that the user has the first document on file.

The method may also include determining that a time frame for the user to provide the document has expired. In response to determining that the time frame for the user to provide the document has expired, the request to enroll the user in the product or service may be cancelled.

In some aspects, the method may include determining a second document on file for the user with the institution. Based on the determining the second document on file for the user with the institution, a second product or service that uses the second document may be determined. An indication that the user is pre-qualified for the second product or service may be generated.

Some aspects as disclosed herein are directed to, for example, a system and method of receiving a request to enroll a user in a product or service provided by an institution. The product or service may use a document, and the user might not have the document on file with the institution in some instances. A computing device may determine whether the user visits a location of the institution. In response to determining that the user visits the location of the institution, a notification that the user does not have the document on file with the institution may be generated.

In some aspects, the location may comprise an automated device operated by the institution, and determining that the user visits the location of the institution may comprise determining that the automated device received user information that identifies the user. For example, the automated device may comprise an ATM, and the information identifying the user may be gleaned from a bank card and/or PIN provided by the user via the ATM.

In some aspects, the location may comprise a branch location of the institution, and determining that the user visits the location of the institution comprises determining that an agent of the institution has provided, via a workstation of the agent, user information that identifies the user. Furthermore, the institution may comprise a financial institution, and the location of the institution may comprise a branch of the financial institution. For example, the user may visit the branch of the financial institution to initiate a transaction with the financial institution via an agent at the branch location. When the agent (or the user) enters information identifying the user (e.g., customer name, customer account number, bank card number, and the like), the workstation may collect the information. A computing device may determine that the user visits the location of the institution based on this information collected by the workstation.

Generating the notification that the user does not have the document on file with the institution may comprise sending, by a computing device and to a device at the location of the institution (e.g., an agent's workstation or an ATM), an instruction for the device at the location of the institution to display an indication that the user does not have the document on file with the institution and an option to generate the document. In response to receiving a selection of the option to generate the document, the device at the location of the institution may generate the document, such as by printing a physical copy of the document and/or by generating an electronic copy of the document.

In some aspects, in response to a determination that the user does not have the document on file with the institution, a status identifier for the document may be generated. The status identifier may indicate, for example, that the user is missing the document. After generating the notification that the user does not have the document on file with the institution, the document may be received from the user or an agent of the institution. Furthermore, in response to receiving the document, the status identifier for the document may be updated to indicate that the user has the document on file.

Some aspects as disclosed herein are directed to, for example, a system and method of determining that a customer of an institution offering a product or service is missing a document used for the product or service. A future time that the customer of the institution is expected to visit a location of the institution may also be determined. Determining the future time may include, for example, searching a plurality of schedules to identify a first schedule. The future time may be determined based on the first schedule, for example, if the first schedule identifies the customer and identifies the future time.

At a predetermined time relative to the determined future time, a notification that the customer is missing the document used for the product or service may be generated. For example, the predetermined time may occur at a predetermined time period prior to or after the future time. The predetermined time may also be the same time as the future time.

In some examples, the notification may comprise a first notification, the location may comprise a first location, and the institution may comprise a plurality of locations including the first location. In these examples, the method may include determining that the customer visits at least one of the plurality of locations prior to the predetermined time. In response to determining that the customer visits at least one of the plurality of locations prior to the predetermined time, a second notification that the customer is missing the document used for the product or service may be generated. The second notification may be generated for the at least one of the plurality of locations and prior to generating the first notification.

BRIEF DESCRIPTION OF THE DRAWINGS

The present disclosure is illustrated by way of example and not limited in the accompanying figures in which like reference numerals indicate similar elements and in which:

FIG. 9 illustrates an example user interface for selecting one or more documents to generate in which various aspects of the disclosure may be implemented.

FIG. 10A illustrates an example of a document pre-populated with customer information in which various aspects of the disclosure may be implemented.

FIG. 10B illustrates an example of a blank document in which various aspects of the disclosure may be implemented.

FIG. 11 illustrates an example user interface for selecting one or more documents to send to a customer in which various aspects of the disclosure may be implemented.

FIG. 12 illustrates an example user interface confirming that one or more documents have been sent to the customer in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
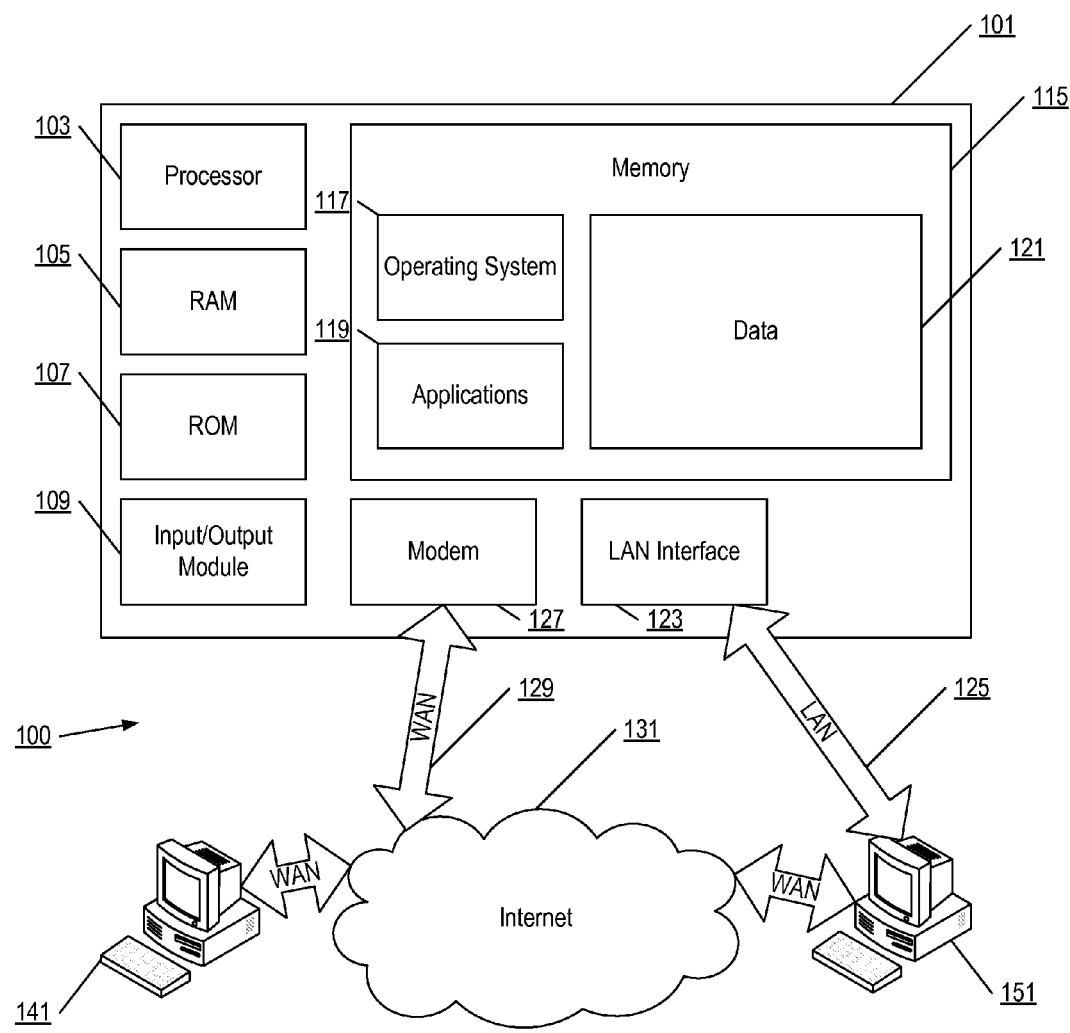
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, etc.) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, etc.) including various other components, such as a battery, speaker, and antennas (not shown).

The disclosure is operational with numerous types of general purpose or special purpose computing devices. Examples of well-known computing devices that may be suitable for use with the disclosure (including the system of FIG. 1) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
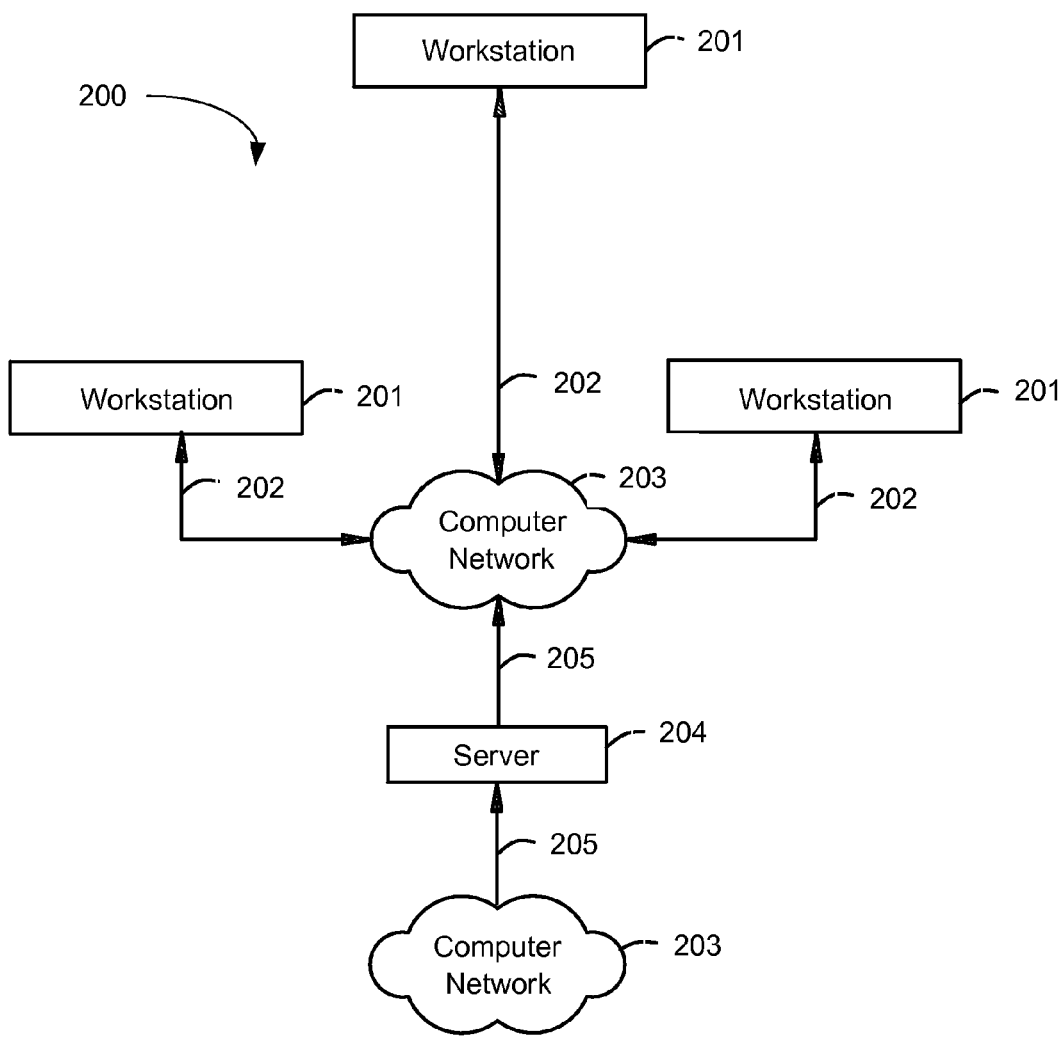
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

A brief summary of aspects described herein will now be described, with additional details to follow. A customer may desire to enroll in a transaction, such as a product or a service, offered, managed, and/or owned by an institution, such as a financial institution. The customer may attempt to directly enroll in the product or service or may enroll in the product or service through an agent of the institution. The customer and/or agent may select the product or service (e.g., via one of the workstations 201), and a computing device may determine which documents the product or service uses (e.g., requires), which documents the customer has on file already, and/or which documents the customer is missing. The computing device may cause the customer and/or agent to be notified of the missing documents. When the customer and/or agent provides all of the documents for the product or service (or an exception applies to one or more missing documents), the computing system may enroll the customer in the selected product or service.

A transaction that the customer desires to enroll in may comprise a service and/or product, such as a financial service or product. Examples of these products and/or services include investing, advisory, retirement, education, portfolio management, financial research, lending, cash management, and the like. Other examples of products and/or services are described below.

Each document may be identified by a document identifier (e.g., a document code), which may be unique to the document. Some documents may require signatures, and other documents might not require signatures. Numerous types of documents may be used for each product or service. In some aspects, a document may comprise a legal document, such as a contract, a notice required by statute, and the like. A document may also comprise a letter of authorization (LOA) that authorizes an institution to act on behalf of a customer. For example, an LOA may authorize a financial institution to invest the customer's funds, distribute funds to one or more beneficiaries, transfer funds to another account, buy and/or sell stocks, define how often statements are delivered to the customer, identify proxies for the customer, tie other accounts owned by the customer (e.g., cash accounts) to an investment account, change the manager or financial advisor (FA) of the investment account, change auto rebalance settings, and change the customer account type (e.g., individual, joint, estate, conservatorship, guardianship, corporation, foreign corporation, unincorporated organization, endowment, financial foundation, charitable organization, federal government, state government, municipal government, school district, other non-government agency, and the like), among numerous other actions the financial institution may perform for the customer.

In some aspects, one document may comprise a primary document that governs a relationship between the institution and the customer. For example, the primary document may generally grant a financial institution permission to manage and/or invest the customer's funds. In some aspects, a primary document may require a signature from the customer to be complete. Other documents may comprise secondary documents. For example, one or more secondary documents may comprise additional product or service elections that grant the financial institution additional (e.g., more specific) permissions, such as to buy or sell stocks in an international emerging market, to use other outside institution's services in investing the customer's funds, exceptions to investment solutions, and the like. In some aspects, secondary documents might not require a signature from the customer to be complete. In yet other aspects, some secondary documents might require signatures, and other secondary documents might not require signatures. The primary and/or secondary documents may be any of the LOAs previously discussed.

Figure 3:
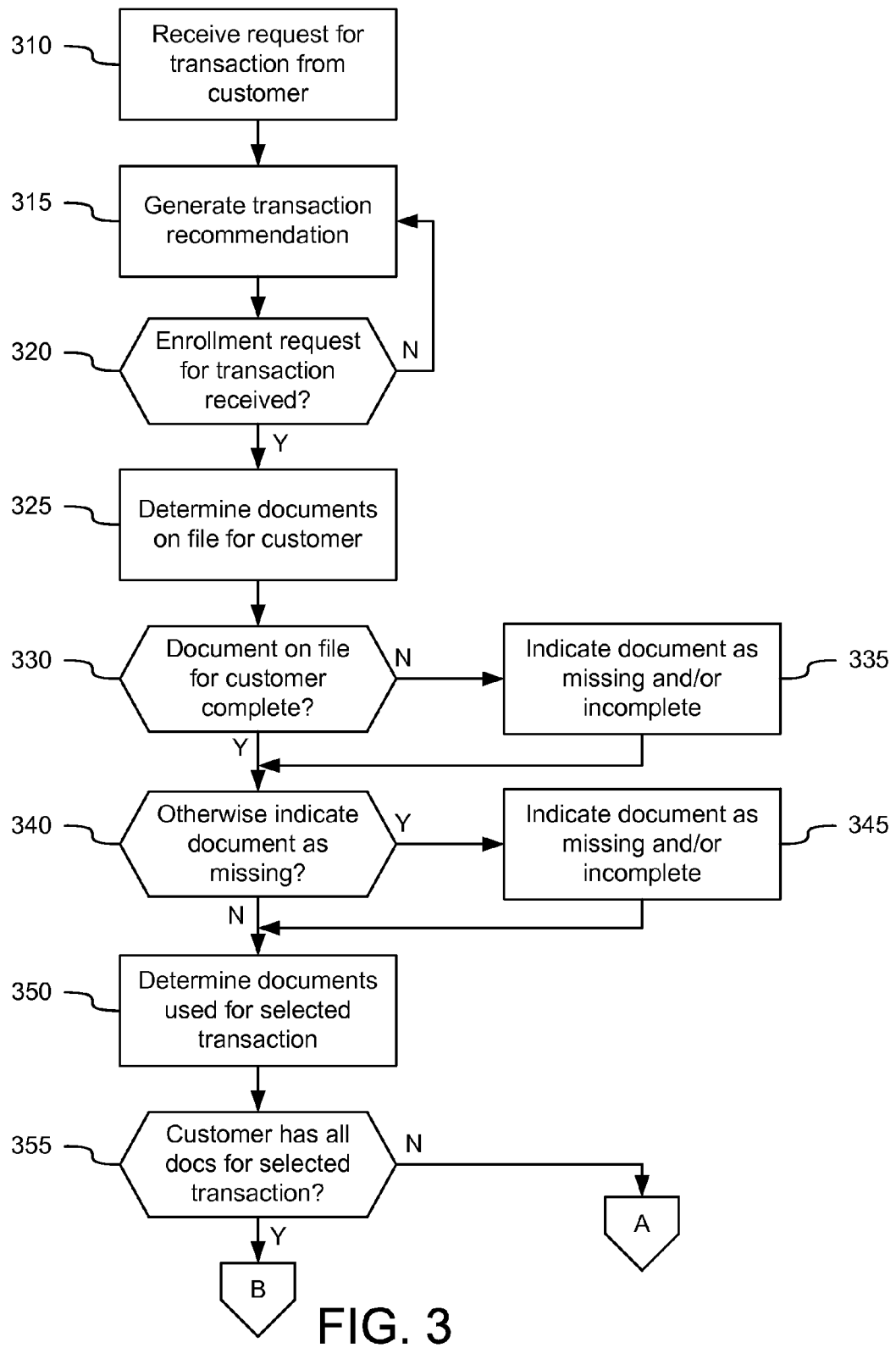
FIG. 3 illustrates an example of at least a portion of a flow diagram for determining whether a customer has all the documents to enroll in a product or service in which various aspects of the disclosure may be implemented.

FIG. 3 illustrates an example of at least a portion of a flow diagram for determining whether a customer has all the documents to enroll in a product or service in which various aspects of the disclosure may be implemented. The steps illustrated in the flow diagram may be performed by, for example, one or more computing device 101.

In step 310, the computing device may receive a request for a transaction from a customer. As previously discussed, the transaction may include a product or service, such as a financial service or product (e.g., investment advice, retirement account, and the like). The request may be received directly from the customer, such as via the customer's workstation of other device. Alternatively, the request may be received from an agent of an institution on behalf of the customer, such as a financial advisor of a financial institution that provides the requested financial service or product. In some aspects, the request might not specify a particular service or product. Rather, the customer or agent may request the computing device or institution to recommend one or more services suited to the customer.

In step 315, the computing device may generate a recommendation for one or more service based on information provided by the customer or agent. Examples of information provided to the computing device include, but are not limited to, the customer's demographics (e.g., age, employment, gender, geographical location, salary, children, and the like), the customer's current accounts with the institution or with another institution (e.g., a savings account, an investment retirement account, and the like), and the customer's goals (e.g., retirement age, level of investment risk, current assets, likely future assets, and the like), among other information. Based on the received information, the computing device may generate a recommendation for one or more service that fits the customer. As an alternative to the computing device generating the recommendation, the customer may interact with an agent of the institution to identify one or more services that the customer would like to enroll in. For example, the customer may explain his or her demographics, current accounts, and goals, and provide other information to the agent, and the agent may recommend one or more services.

In step 320, the computing device may determine whether an enrollment request for a transaction has been received. In other words, the computing device may determine whether the customer (or agent) has selected a service or product to enroll the customer in. The enrollment request may be received directly from the customer (e.g., via telephone, via the customer's workstation) or from the agent. For example, a financial advisor may launch a software program or tool (having document calculator capabilities) and input the product or service that the customer has selected into the software program or tool. If an enrollment request has not been received (step 320: N), the computing device or agent may return to step 315 to identify other transactions that might interest the customer. On the other hand, if a request to enroll in a product or service is received (step 320: Y), the computing device may proceed to step 325.

In step 325, the computing device may determine which documents the customer has on file with the institution. For example, the computing device may retrieve a profile for the customer (which may be stored in a database of the institution) to make this determination. As previously discussed, each document may have a unique identifier, which may be used to determine which documents the customer has. In one example, the computing device may determine that the institution has Document A, Document B, and Document C for the customer on file.

In step 330, the computing device may determine whether a document on file for the customer is complete. For example, the computing device may determine whether a document that should be signed is signed (physically or electronically). If the document is not signed, in step 335, the computing device may indicate (e.g., categorize) that document as missing or otherwise incomplete. For example, Document A might require a signature, but the copy of Document A on file for the customer might not have the customer's signature. The computing device may categorize Document A as missing and store the categorization in the customer's profile.

The computing device may also determine that a document on file for the customer is incomplete (step 330: N) if, for example, the document is signed by the incorrect person or the signature is dated earlier than a predetermined time (e.g., more than 90 days before the enrollment request date). The computing device may determine that the signature is from the wrong person using image recognition. For example, the computing device may retrieve the customer's signature from a database of the institution (e.g., from a previous check the customer signed or other signature that the customer previously provided) and compare the previous signature to the signature on the document. Additionally or alternatively, the computing device may determine that the signature is from the wrong person based on character recognition of the signature, which may be a digital signature. For example, the signature on the document might state "/s/First_Name Last_Name," "/First_Name Middle_Initial Last_Name/," "/s/Nickname," or any other form of digital signature. The computing device may determine whether the correct person signed the document by comparing the digital signature to information identifying the customer, such as the customer's name on the enrollment request or other account held by the customer with the institution. The computing device may similarly determine whether the document is complete based on whether the account number (or other identifier) on the document matches the account number on the enrollment request or other account held by the customer with the institution.

In step 340, the computing device may determine whether the document on file for the customer should otherwise be indicated as missing. For example, an agent of the institution may have the option to manually indicate the document as missing by inputting the information into the software tool. The agent may be able to view documents on file for the customer within the software tool. If the agent identifies an issue with one or more documents (e.g., missing a signature or the customer's initials, missing a page, document updated, or any other reason), the agent may mark that document as missing. In step 345, the computing device may receive the indication from the agent (via the software tool) and indicate the document as missing or otherwise incomplete. The indication may be stored in the customer's profile.

In step 350, the computing device may determine which documents are used (which may be required) for the product or service selected by the customer or agent. Examples of various types of documents were previously described, such as a master agreement. Each product or service offered by the institution may be associated with one or more documents, and each association may be stored in a database of the institution. For example, a first service may use Document A, Document C, and Document E. As another example, a second service (which may be the service selected by the customer) might use Document A, Document B, Document D, and Document E. The institution may store each of these associations.

In some aspects, one or more additional documents may be added to a service. The software tool may display an interface that permits an agent of the institution to select other documents to add to a particular service and/or upload those documents to the database. For example, the agent may upload a Document F for the first service described above. The computing device may receive (or retrieve) Document F and generate an association between the first service and Document F.

In step 355, the computing device may determine whether the customer has all of the documents used for the selected service by comparing the documents used for the service (e.g., as determined in step 350) to the documents that the customer has on file with the institution (e.g., as determined in step 325) and not missing a signature or otherwise indicated as missing or incomplete. If the customer has all of the documents (step 355: Y), the computing device may follow reference 'B' to FIG. 7, which will be described in further detail in the examples below. If the customer does not have all of the documents used for the selected transaction (step 355: N), the computing device may follow reference 'A' to FIG. 4, which will be described in further detail in the examples below. In one example of step 355, the selected service may be the second service described above and use Document A, Document B, Document D, and Document E. The customer might have Document A, Document B, and Document C on file. In step 355, the computing device in step 355 may determine that the customer is missing Document D and Document E and accordingly follow reference 'A' to FIG. 4.

Figure 4:
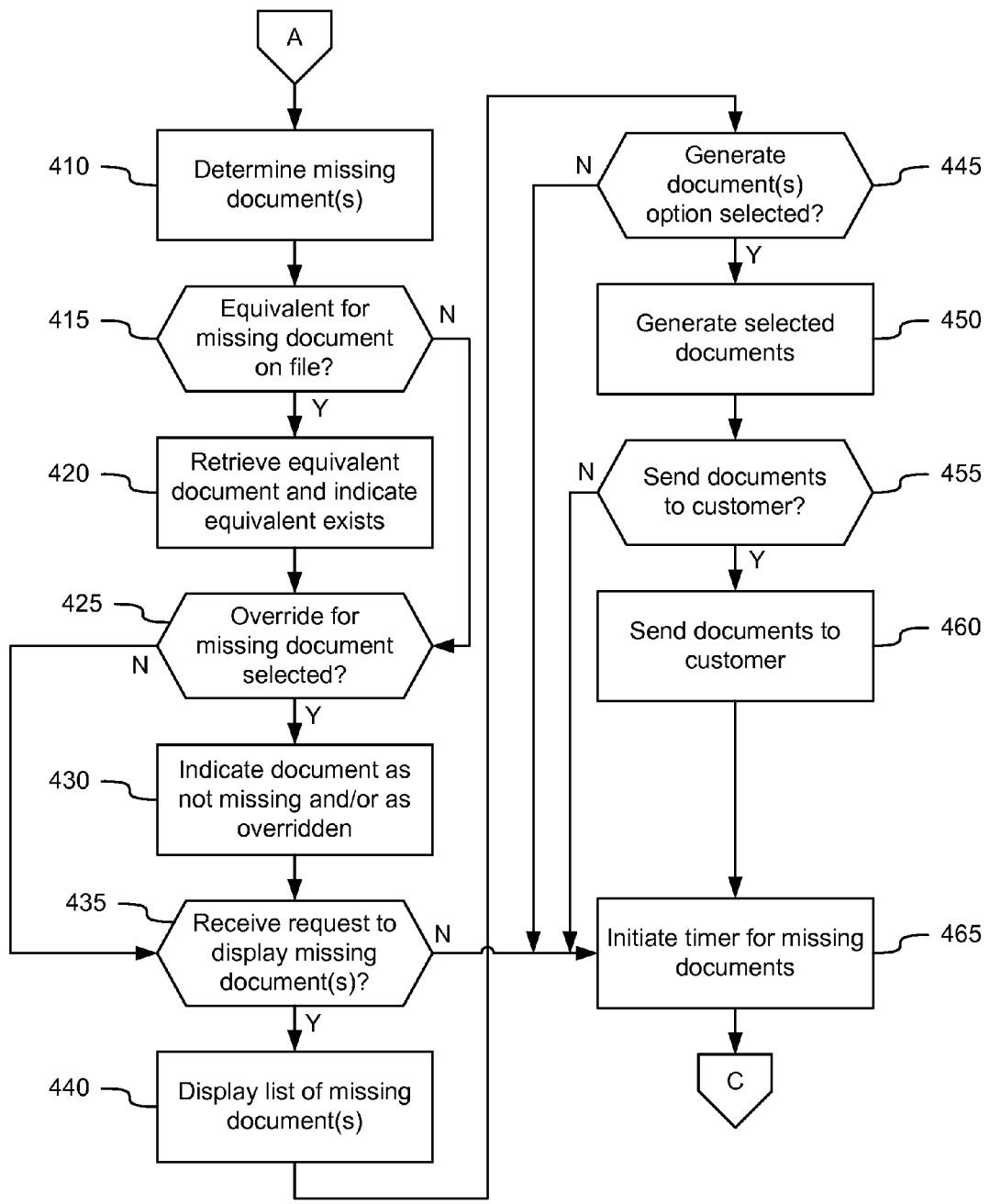
FIG. 4 illustrates an example of at least a portion of a flow diagram for determining documents the customer may be missing in which various aspects of the disclosure may be implemented.

FIG. 4 illustrates an example of at least a portion of a flow diagram for determining documents the customer may be missing in which various aspects of the disclosure may be implemented. The steps illustrated in the flow diagram may be performed by, for example, one or more computing device 101.

In step 410, the computing device may determine (or otherwise identify) the missing documents for the service selected by the customer. As previously discussed, the computing device may make this determination by comparing the document identifiers for documents on file for the customer to the document identifiers for documents used for the service selected by the customer or agent.

In step 415, the computing device may determine whether an equivalent document on file for the customer exists for any of the identified missing documents. In some aspects, documents may have previously marked as equivalents. For example, the institution's database may identify Document 1 and Document 2 as equivalents of Document D. If the customer does not have Document 1 or Document 2 on file, the computing device may determine that the customer does not have an equivalent for missing Document D on file (step 415: N). On the other hand, if the customer has Document 1 (and/or Document 2) on file, the computing device may determine that an equivalent for missing Document D exists (step 415: Y) and proceed to step 420.

In some aspects, a document may include one or more subparts. Accordingly, an equivalent might be detected if the customer has each subpart of the document on file. For example, Document D might include subparts Document D1 and Document D2. The computing device may determine that the customer has an equivalent for Document D on file if the customer has both Document D1 and Document D2 on file. Similarly, if Document D1 is the document used for the service, the computing device may determine that the customer has an equivalent for Document D1 on file if the customer has Document D on file, but not if the customer only has Document D2 on file.

In step 420, the computing device may retrieve the equivalent document from a database, store the equivalent document with the customer's profile, and/or store an indication that an equivalent to one of the missing documents exists. As will be discussed in further detail in the examples below, an equivalent document may automatically replace the missing document. Alternatively, review by the agent or another person or system (e.g., an administrator, such as a super user) may be required before the equivalent document can replace the missing document.

In step 425, the computing device may determine whether an override for the missing document has been received, such as from the agent (via the software toolkit) or from a second agent (e.g., the agent's manager or other reviewer). An override may be applied at any point, such as before or after the customer requests to enroll in a particular service, before or after the agent is prompted to select or not to select an override option for a particular document. By selecting the override option, a service enrollment request may be approved even if the customer does not have all required documents on file.

In some aspects, the customer may be categorized as a trusted customer. For example, the institution may store a list of customers that are trusted by default. The computing device may automatically override document requirements for one or more missing documents for trusted customers. In other words, service enrollment requests from trusted customers may be automatically approved and/or one or more required documents might not be required for trusted users (but would be required for users not on the list of trusted users).

In step 430, the computing device may indicate a particular document as not missing if override for the document was selected in step 425. Additionally or alternatively, the computing device may indicate that an override has been selected for the document and store the indication with the customer's profile. As will be discussed in further detail in the examples below, the override indicator may indicate to a second agent reviewing the enrollment request, such as an administrator or a manager, that the second agent should perform a closer review of the overridden document.

In some aspects, an override status indicator might apply to only one service enrollment request. For example, assume the customer attempts to enroll for Service 1, which uses Document T. If the customer does not have Document T on file, the system may proceed to approve the customer for Service 1 if the system receives an override request from an agent of the institution. On the other hand, the override indicator from Service 1 might not apply if the customer subsequently attempts to enroll in Service 2, which also uses Document T. In other words, the system might prompt the customer to provide Document T for Service 2 or the agent to indicate (a second time) an override for Document T for Service 2 even if an override for Document T was used for service 1.

In other aspects, the override status indicator might apply to more than one service enrollment request. For example, assume again that the customer attempts to enroll for Service 1, which uses Document T. If the customer does not have Document T on file, the system may proceed to approve the customer for Service 1 if the system receives an override request from an agent of the institution. If the customer subsequently attempts to enroll in Service 2 (which also uses Document T), the override indicator from Service 1 might apply to the enrollment request for Service 2. In other words, the system might automatically approve the customer for Service 2 without prompting the customer to provide Document T or the agent to indicate (a second time) an override for Document T for Service 2.

The customer's profile may indicate whether an override status indicator applies to a particular service enrollment request or to multiple service enrollment requests. For example, an indicator of 'O' may indicate to the system or computing device that the override request applies only to that particular service enrollment request (e.g., Service 1). An indicator of 'OO' may indicate to the system or computing device that the override request applies to more than one service enrollment request (e.g., both Service 1 and Service 2).

Figure 8:
FIG. 8 illustrates examples of document status indicators for a product or service in which various aspects of the disclosure may be implemented.

FIG. 8 illustrates examples of document status indicators for a product or service in which various aspects of the disclosure may be implemented. The example table illustrated in FIG. 8 may be used by the computing device to store, for a particular customer and/or service enrollment request, document identifiers 810 and their corresponding document statuses 820, qualifiers 830, and/or review statuses 840. As illustrated in FIG. 8, an example service may use Documents A-F.

Document Status 820 may indicate, for example, whether each document is on file, missing, or received. 'On file' may indicate that the institution has the document on file for the customer, such as if the document is stored in a database of the institution or is otherwise accessible to the institution (or an agent of the institution). For example, the customer may have previously uploaded the document to the institution for the current (or a previous) service enrollment request. 'Missing' may indicate that the institution does not have the document on file for the customer. 'Received' may indicate that the institution has received the document from the customer (or agent), such as if the customer (or agent) uploads or otherwise scans the document into the system. In some aspects, the received indicator may be used to indicate that a document was once 'missing' but has since been 'received' by the institution. In some aspects, the received indicator might not be used. Rather, the documents may be categorized as on file or missing.

Qualifier 830 may qualify or otherwise make contingent a document on file (or received). An 'equivalent' qualifier 830 may indicate, for example, that a document on file (or received), such as Document B, is an equivalent of a document used for the product or service. An 'override' qualifier 830 may indicate that a requirement has been overridden for a particular document by an agent, such as for Document C. A 'signature' qualifier 830 may indicate that a document that uses a signature, such as Document F, is missing the signature. A 'blank' qualifier (not illustrated) may indicate that a document is on file for the customer, but that one or more unfilled blanks exist in the document (e.g., the customer's email address, social security number, beneficiary designation, and the like, has not be provided). The qualifier 830 may indicate to an agent or reviewer of the institution that the document on file (or received) should be reviewed by the agent or reviewer.

Review Status 840 may indicate whether a particular document is complete. For example, a review status of 'complete' may indicate that the agent (or other reviewer) has reviewed the document on file (or received) and/or has confirmed that the document is complete. On the other hand, a review status of 'pending' may indicate that the agent (or other reviewer) has not reviewed the document on file (or received) and/or has not yet confirmed that the document is complete. For example, the financial institution may have received Document E from an agent or customer, but a review status of pending for Document E may indicate that the received Document E has not yet been reviewed.

In some aspects, the computing device may automatically identify a document that is on file as complete. In some aspects, the computing device may automatically identify a document that is on file and that does not have a qualifier, such as Document A, as complete. Alternatively, the computing device might not automatically indicate any documents on file as complete until the agent or other review has reviewed the document and indicates the document as complete. For missing documents, the review status (or other status indicator) may indicate whether the missing document has been 'sent' to the customer (e.g., via e-mail, physical mail, and the like). For example, the computing device may indicate Document D as missing, but that a copy has been sent to the customer.

In addition to tracking the status of individual documents, the computing device may also track the status of the service enrollment request as a whole (not illustrated). For example, the computing device may identify the request as enrolled, pending review, or incomplete. Enrolled may indicate that the customer has all documents for the product or service on file and that the agent or other reviewer has confirmed that the customer has all of the documents on file. Pending review may indicate that the customer has all documents on file, but that the agent or other reviewer has not yet confirmed that the customer has all of the documents on file. Incomplete may indicate that the customer does not have all documents on file and that the agent or other reviewer has not yet confirmed the enrollment request.

Returning to FIG. 4, in step 435, the computing device may determine whether a request to display the missing documents has been received, such as by an agent interfacing with the software toolkit via a user interface (e.g., a GUI).

In step 440, the computing device may display, via a user interface of the software toolkit, a list of the missing documents. As previously discussed, the computing device may have identified the missing documents and stored their statuses in a database (e.g., in the table form illustrated in FIG. 8). Documents that have equivalents (determined in step 415 and indicated in step 420) and/or document requirements that have been overridden (determined in step 425 and indicated in step 430) might be excluded from the list displayed to the user (e.g., an agent of the institution). Alternatively, documents that have equivalents and/or the document requirements that have been overridden may be displayed with the missing documents. The display might also include status indicators for each of the equivalent documents and/or overridden document requirements. In some aspects, the computing device may cause a list of all documents for the selected service (i.e., not just missing documents) to be displayed. One or more status indicator may be included on the display indicating the status of each document, as previously discussed.

In step 445, the computing device may determine whether the option to generate one or more documents has been selected, such as by the agent via the user interface. If the generate option has been selected (step 445: Y), the computing device may generate one or more documents in step 450. Generating a document may include printing a physical copy of the document. For example, the computing device may send an instruction to a connected printer (e.g., a local or networked printer) or a third-party service provider (e.g., FEDEX, UPS, USPS, and the like) to print one or more of the documents for the selected service. Additionally or alternatively, generating a document may include generating an electronic (digital) copy of the document (e.g., in MICROSOFT WORD format, PDF format, and the like). The generated document may be blank or pre-populated, and the user interface presented to the agent may give the agent the option to select blank or pre-populated for each document prior to generation. If the document is to be pre-populated, the computing device may retrieve customer information (e.g., name, e-signature, address, telephone number, and the like) from a profile of the user stored with the institution, such as from the service enrollment request or another account the user has with the institution.

The computing device may generate all of the documents used for the particular service the customer desires to enroll in. For example, as discussed above, a second service might use Document A, Document B, Document D, and Document E. The computing device may generate (e.g., print) each of Document A, Document B, Document D, and Document E for the customer when the generate document option is selected. Alternatively, the computing device may generate all of the missing documents. For example, if the customer is missing Document D and Document E, the computing device may generate Document D and Document E when the generate option is selected. Additionally or alternatively, the agent may select individual documents to be generated (whether missing or not), and the computing device may generate the documents selected by the agent.

FIG. 9 illustrates an example user interface for selecting one or more documents to generate in which various aspects of the disclosure may be implemented. The user interface may be displayed on, for example, the user's (e.g., an agent's) workstation or other device (e.g., a smartphone, tablet, and the like) when the user launches the document calculator software toolkit. If the user selects the Generate Documents button 910, the Generate Documents window 920 (e.g., a pop-up, a split window, and the like) may be displayed on the workstation.

The Generate Documents window 920 may provide the user the option to generate one or more documents for the selected product or service, as previously discussed. The window 920 may identify the customer (e.g., <Customer Name>) and/or the product or service the customer desires to enroll in (e.g., <Product or Service Name>). The window 920 may also list the documents used for the product or service, such as Documents A-E. As illustrated, Document A may comprise a primary document (such as a general agreement between the institution and the customer) generally applicable to all products and services provided by the institution. Documents B-E, on the other hand, may comprise secondary documents applicable to the particular product or service selected by the customer. As illustrated, the customer may have two accounts, Account 1 and Account 2, each using different documents (e.g., Documents B, C, and D for Account 1 and Documents B, C, and E for Account 1).

The window 920 may also indicate whether the customer has each document on file (e.g., 'Yes' or 'No'). For example, the window 920 may indicate that the customer has Documents A-C on file, but not Documents D or E. The window 920 may include any of the indicators previously discussed (e.g., with reference to FIG. 8). For example, an asterisk (*) is included next to Document B, which may indicate that Document B is an equivalent of a document used for the selected product or service. As another example, an 'O' is included next to Document C, which may indicate that the requirement for Document C has been overridden by the agent or other reviewer.

The user may also be given the option to select one or more of the documents to generate. As illustrated, the user has selected to generate Document A, Document D, and Document E (as indicated by the checkmarks next to each of these documents). The user may also be given the option to select only the missing Documents D and E (e.g., via the 'Select Missing' button), to select all of the documents (e.g., via the 'Select All' button), or to deselect all of the documents (e.g., via the 'Deselect All' button). Once the user has selected the documents to generate, the user may click the 'Generate Selected' button 930 to generate the selected documents. As previously discussed, generating documents may include, for example, printing a physical copy of the documents and/or generating electronic copies of the documents. As also previously discussed, the user may indicate whether the document should be generated with customer information (i.e., pre-populated with customer information) or whether a blank version of the document should be generated.

FIG. 10A illustrates an example of a document pre-populated with customer information in which various aspects of the disclosure may be implemented. For example, the customer's address information (street, city, state, and zip), name, and/or title may be retrieved from the customer's profile with the institution and included in Document D. FIG. 10B illustrates an example of a blank document in which various aspects of the disclosure may be implemented. As illustrated, the computing device might leave the customer's address and acknowledgment fields blank rather than pre-populating them. In some aspects, the documents in FIGS. 10A and/or 10B may be generated in response to the user may clicking on a document identifier in window 920. For example, Document D illustrated in FIG. 10A may be generated if the user clicks 'Document D' in FIG. 9. Similarly, Document E illustrated in FIG. 10B may be generated if the user clicks 'Document E' in FIG. 9.

Returning to FIG. 4, in step 455, the computing device may determine whether to send one or more of the documents (missing or not) to the customer. For example, the GUI may display an option to send one or more documents to the customer. If the agent selects the option to send the document, the computing device may send the document to the customer in step 460. The agent may decide to send the documents to the customer if, for example, the customer is not currently in the presence of the agent or the customer would like more time to review the document. The document(s) may be sent by mail, e-mail, or using any other physical and/or electronic delivery method. For example, if a digital copy of a document is generated, the digital copy may be e-mailed to the customer's e-mail address stored in the customer's profile. If a physical copy of the document is generated, a mailing label with the customer's address may be pre-populated and printed to mail the physical copy to the customer's address. When a document is sent to the customer, a status indicator of 'sent' may be placed next to the sent document, as previously discussed.

In some aspects, the customer may be provided a link (e.g., a URL or other resource identifier) to a system for facilitating receipt of electronic signatures and/or for receiving uploaded documents. The electronic system may display a list of documents for the customer to upload and/or sign, and the customer may sign and/or upload documents through the system. In some aspects, the customer may be directed to the electronic signature/document upload system when the agent selects an option on the user interface of the software toolkit.

FIG. 11 illustrates an example user interface for selecting one or more documents to send to a customer in which various aspects of the disclosure may be implemented. If the user selects the Send for Signature button 1110, the Send Documents for Signature window 1120 (e.g., a pop-up, a split window, and the like) may be displayed on the workstation.

The window 1120 may provide the user the option to send one or more documents for the selected product or service, such as for a signature, to the customer (whether the document is missing or not). As illustrated, the user has selected to send Document A (not missing) and Documents D and E (each missing) to the customer. The user may also select the method of delivery (e.g., e-mail, physical mail, and/or via an e-signature system). For example, the user may be provided with a drop down menu (not illustrated) giving the user these options.

For Document A, the user may have selected to send the document to the customer via e-mail and via the e-signature system. Accordingly, the window 1120 may display the customer's email address (<Customer_Email_Address>) and the customer's name (<Customer Name>) and/or user ID (<Customer_User_ID>) associated with the e-signature system. Document D may also be sent to the customer via e-mail and via the e-signature system. For Document E, the user may have selected to send the document to the customer via physical mail. Accordingly, the window 1120 may display the customer's physical mailing address (<Customer_Mailing_Address>) and optionally the Customer Name (<Customer Name>).

Once the user has selected the documents to send, the user may click the 'Send for Signature' button 1130 in window 1120 to send the selected documents. For example, Documents A and D may be sent via email and the e-signature system to the customer. A mailing label for Document E may be printed, and Document E may be mailed to the customer's address on file. A confirmation that the documents have been sent (or will be sent) may also be displayed. FIG. 12 illustrates an example user interface confirming that one or more documents have been sent to the customer in which various aspects of the disclosure may be implemented.

Returning to FIG. 4, in step 465, the computing device may initiate a timer for receiving missing documents from the customer. The timer may be used to track the amount of time it takes for the customer or agent to provide a copy of a missing document (e.g., from the initial tracking date for the missing document). The timer may also be used to cancel an enrollment request if missing documents are not received and/or processed (e.g., scanned into the system or database) within a predetermined timeframe. For example, the predetermined timeframe may start on the day that the service enrollment request is initiated and/or the day when a document is identified as missing. The timeframe may run until, for example, 30 days in the future, giving the customer or agent 30 days to send or scan in the missing document. If missing documents are not received within the predetermined timeframe, the service enrollment request may be cancelled. In some aspects, the predetermined timeframe may be adjusted by, for example, an agent of the institution.

Figure 5:
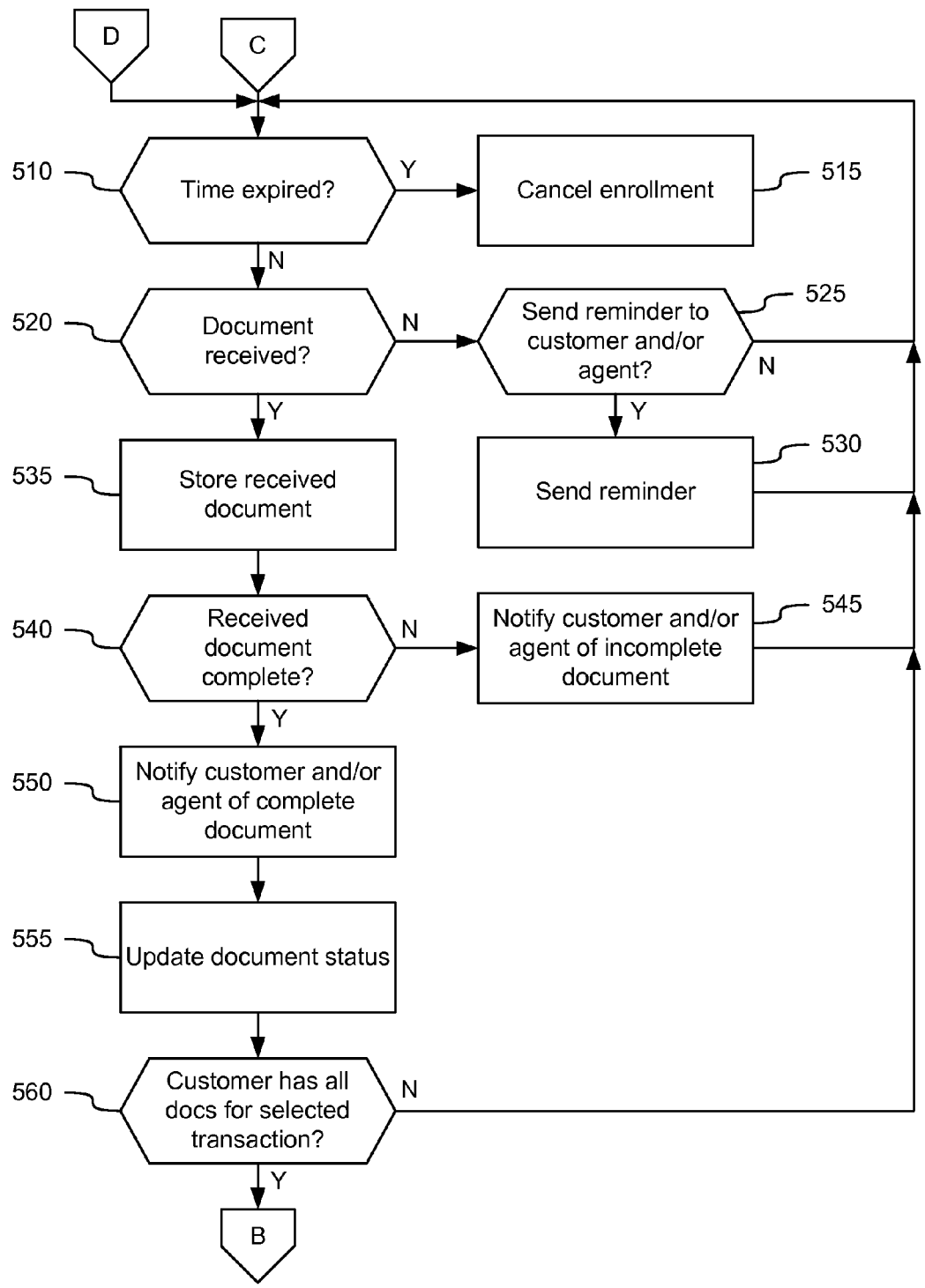
FIG. 5 illustrates an example of at least a portion of a flow diagram for receiving documents from a customer or agent for enrolling in a product or service in which various aspects of the disclosure may be implemented.

FIG. 5 illustrates an example of at least a portion of a flow diagram for receiving documents from a customer or agent for enrolling in a product or service in which various aspects of the disclosure may be implemented. The steps illustrated in the flow diagram may be performed by, for example, one or more computing device 101.

In step 510, the computing device may determine whether the time to receive the missing documents has expired. For example, if the predetermined timeframe (previously discussed) is 30 days, the computing device may determine that time has expired (step 510: Y) and cancel the service enrollment in step 515 (or otherwise set the request to an inactive state). A message indicating that the service enrollment request has been cancelled or suspended may be sent to the customer or agent. For example, a dashboard alert may be displayed (via the user interface) on the agent's workstation indicating the cancellation. On the other hand, if time has not expired (step 510: N), the computing device may perform additional steps.

In step 520, the computing device may determine whether a missing document has been received by the system. For example, the computing device may retrieve a file (e.g., from the user's profile) that corresponds the enrollment request with documents and/or document statuses to determine whether a missing document has been received. If not (step 520: N), the computing device may determine whether to send a reminder to the customer directly or to the agent to provide missing documents in step 525. For example, a reminder (e.g., an alert) may be periodically sent to the customer or agent (e.g., every 10 days). Additionally or alternatively, a reminder may be sent at a predefined time, such as 25 days from initiation of the transaction.

In step 530, the computing device may send the reminder to the customer or agent. A reminder to the agent may include, for example, an automated telephone call to the agent's phone number, an e-mail to the agent, an alert displayed on the agent's computer screen (e.g., via the GUI), and the like. For example, a dashboard alert may be displayed on the agent's computer screen every 10 days until a missing document has been received. A reminder to the customer may include, for example, an automated telephone call to the customer's phone number, an e-mail to the customer, a physical letter sent to the customer's address, and the like. The reminders may list the missing documents, list the amount of time (e.g., in days) since the service enrollment request was initiated and/or the computing device determined that a document was missing, identify the customer and identify the particular service enrollment request, among other information. On the other hand, if a missing document has been received by the system (step 520: Y), the computing device may perform additional steps.

In step 535, the computing device may store a received document, such as missing Document D, at a storage location within a network of the institution. Receipt of a document may include, for example, scanning the document into the system. The computing device may also capture the date the document was received (e.g., M/D/Y and/or time) and store the date with the document (e.g., as metadata).

In step 540, the computing device may determine whether the received document is complete. For example, the computing device may automatically determine whether blanks in the document (e.g., for name, address, and the like) have been filled out. The computing device may also determine whether the document includes a signature if the signature is required.

If the received document is incomplete (step 540: N), the computing device may notify the customer and/or agent that the document is incomplete in step 545. If the received document is complete (step 540: Y), the computing device may notify the customer and/or agent that the document is complete in step 550. The computing device may also indicate the current status of the service enrollment request (e.g., pending review, all documents received, documents missing, signatures missing, and the like). The notice may be similar to the reminders discussed above with respect to steps 525 and 530 (e.g., a dashboard alert, an e-mail message, and the like).

In step 555, the computing device may store a status indicator and/or update an existing status indicator (e.g., as illustrated in FIG. 8) to indicate that the document has been received and/or is complete. For example, the computing device may change the status indicator from 'missing' (or any other indicator) to 'received' or 'complete' (or any other indicator).

In step 560, the computing device may determine whether the customer has all of the documents used for the selected service. This step may be substantially similar to step 355 previously discussed. If the customer has all of the documents (step 560: Y), the computing device may follow reference 'B' to FIG. 7, which will be described in further detail in the examples below. If the customer does not have all of the documents used for the selected transaction (step 560: N), the computing device may return to step 510 to determine whether the timeframe to receive missing documents has expired.

Figure 6:
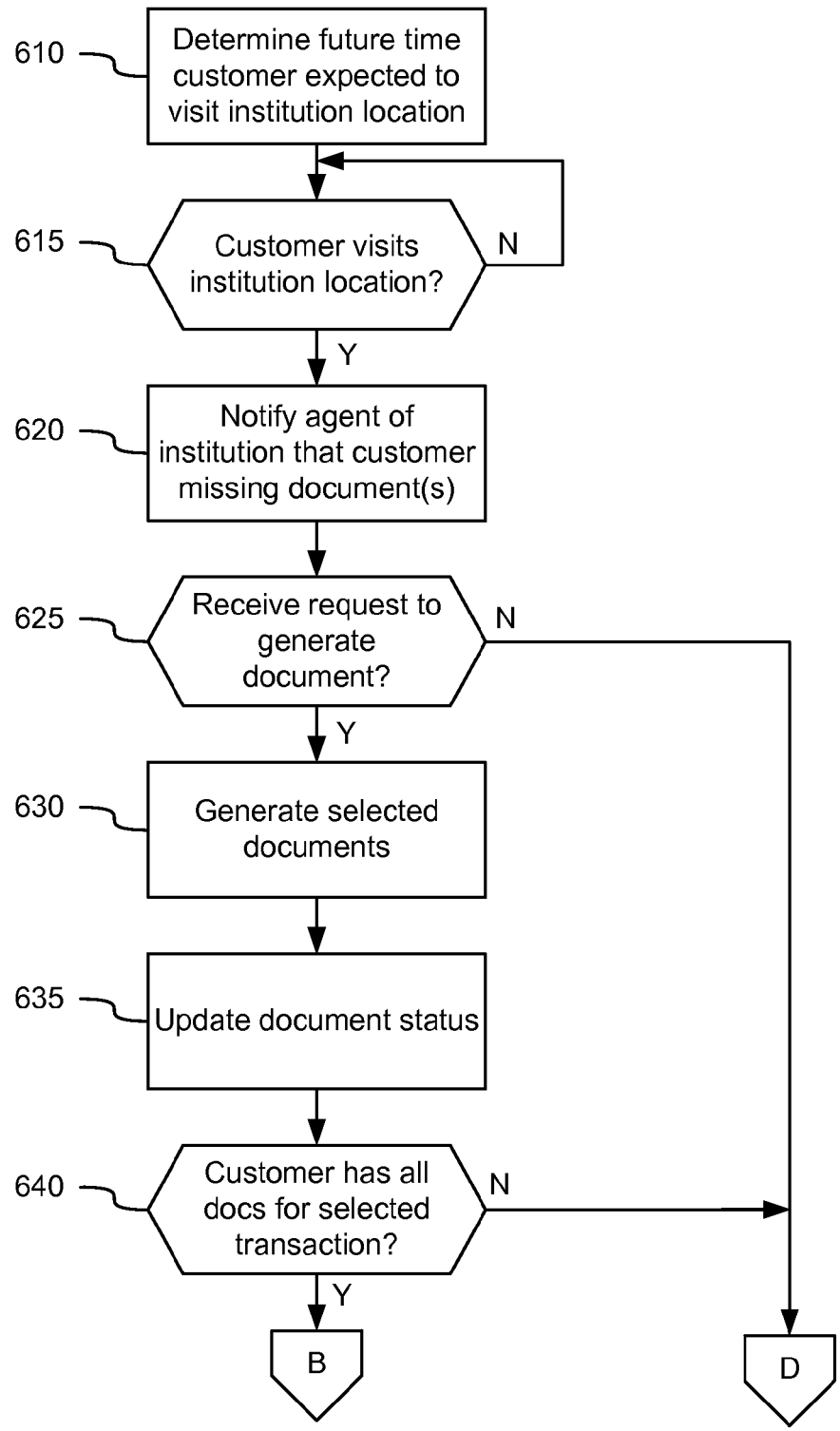
FIG. 6 illustrates an example of at least a portion of a flow diagram for notifying an agent of an institution that a customer is missing documents in which various aspects of the disclosure may be implemented.

FIG. 6 illustrates an example of at least a portion of a flow diagram for notifying an agent of an institution that a customer is missing documents in which various aspects of the disclosure may be implemented. The steps illustrated in the flow diagram may be performed by, for example, one or more computing device 101. As will be described in the details that follow, the steps illustrated in FIG. 6 may be used to conveniently provide customers with the opportunity to provide and/or sign documents, such as when the customer visits the institution providing the product or service selected by the customer.

In step 610, the computing device may determine a future time, such as the next time, that the customer is expected (e.g., scheduled) to visit a location of the institution offering the selected service. The determination may be made based on information stored by the institution, such as appointment information, calendar information, and the like. The computing device may search schedules (e.g., calendars) of agents of the institution to determine the future time. For example, an agent's electronic calendar (e.g., the agent that assisted the customer in imitating enrollment in a service) may indicate that the agent is schedule to meet with the customer in two weeks at 4:00 PM EST. The calendar appointment may identify the customer (e.g., by name, account number, email address, and the like) and the future time, two weeks at 4:00 PM EST. The computing device may make this determination based on any of the information included in the appointment, such as text searching the appointment for a customer identifier (e.g., name, account number, e-mail address, or any other unique identifier) and/or the time of the appointment (e.g., M/D/Y and/or time of day).

The computing device may also use information from other agents and/or employees of the institution to make the determination. For example, if the institution is a financial institution, such as a bank and/or investment advisory company, the computing device may search electronic information of brokers, bank tellers, financial advisors, or any other agents and/or employees of the financial institution to determine the next time the customer is scheduled to visit a location of the financial institution, such as a branch of the financial institution (e.g., banking center, financial advisor branch, automatic teller machine, and the like). This information may be stored with the customer's profile and be used to predict when it will be convenient to remind the customer to fill out, sign, or otherwise provide a missing document.

In step 615, the computing device may determine whether the customer has visited a location of the institution. This determination may be made based on calendar or appointment information, as previously discussed. For example, the customer may be scheduled to visit with his or her financial advisor on Jun. 8, 2018 at 4:00 PM EST, which may be indicated in a calendar appointment. Additionally or alternatively, this determination may be made based on real-time information provided by the customer or an agent of the institution.

In some aspects, an agent of the institution may provide information identifying the customer (e.g., a PIN number, a debit or credit card number, a name, an account number, a mobile phone number, an e-mail address, and the like). For example, in the financial institution context, the customer may visit a branch of the financial institution, such as a banking center, to deposit a check, open a new account, purchase a money order, or request any other transaction provided by the financial institution. At some point during the interaction with the customer, the bank teller or other agent may input the information identifying the customer into the teller's workstation. After the information is provided, the workstation may send an indication (or cause an indication to be sent) to the computing device notifying the computing device that the customer is at the banking center. The same could apply to other locations of the financial institution, such as a branch location, a financial advisor location, or any other location.

In some aspects, the customer may directly provide information identifying the customer (e.g., a PIN number, a debit or credit card number, a name, an account number, a mobile phone number, an e-mail address, and the like). For example, the customer may visit an automated device, such as an ATM, owned and/or operated by the financial institution. When the customer provides information that identifies the customer, such as by inserting a card (e.g., a bank card) and/or providing a PIN number (or other password) at the ATM, the ATM may send an indication (or cause an indication to be sent) to the computing device that the customer is at the ATM location.

In some aspects, the customer may be scheduled to visit a location of the institution at a predetermined time, such as Jun. 8, 2018 at 4:00 PM EST. However, the customer might make an unscheduled visit to one of the locations of the institution at a time prior to June 8. In these circumstances, a notification that the customer is missing a document for a product or service may be generated at a time relative to the customer's unscheduled visit (e.g., based on inputted customer information as discussed above), in addition to or instead of the notification to be generated relative to the user's scheduled June 8 visit.

In step 620, the computing device may generate a notification that the user does not have the document on file with the institution. In some aspects, the computing device may send a message (or cause a message to be sent) to the current location of the customer indicating that a document is missing. For example, if the customer is at an ATM, the ATM may be notified that the customer is missing a document. If the customer is at a banking center, the workstation of the agent currently interacting with the customer may be notified that the customer is missing a document. The workstation or ATM may also be instructed to display an indication that the customer is missing a document and/or an option for the workstation or ATM to generate (and/or display) the missing document(s).

If the customer is scheduled to visit with an agent of the institution at a particular time (e.g., as indicated on a calendar or other database location of the institution), a notice may be sent to the agent, such as via the agent's workstation, at a predetermined time. The predetermined time to send the notice may be relative to the future time the customer is expected to visit the location. For example, the notice may be sent or displayed to the agent before the customer is scheduled to arrive, such as 5 minutes before the scheduled meeting time. Additionally or alternatively, the notice may be sent or displayed to the agent at the scheduled meeting time. Additionally or alternatively, the notice may be sent or displayed to the agent after the customer is scheduled to arrive, such as 10 minutes after the scheduled meeting time.

In step 625, the computing device may determine whether a request to generate the missing document has been received. For example, a request may be received if the agent and/or the customer has selected the option to generate the missing document(s), including (as previously discussed), printing or generating an electronic copy of the missing document(s). If a request to generate the missing document has been received (step 625: Y), the computing device may generate all of the missing documents or only the documents selected for generation. Step 630 may be performed like step 450 previously discussed. Furthermore, the example user interfaces illustrated in FIG. 11 and FIG. 12 may be used by the agent or customer to generate the missing document.

In step 635, the computing device may update the status of the missing document. For example, if the customer and/or agent has provided the missing document (e.g., filled in blanks, signed the document, uploaded the document, scanned in the document), the computing device may update the status of the document in the customer's profile (e.g., 'missing' to 'received'), as previously discussed with respect to step 555.

In step 640, the computing device may determine whether the customer has all of the documents used for the selected service. This step may be substantially similar to step 355 previously discussed. If the customer has all of the documents (step 640: Y), the computing device may follow reference 'B' to FIG. 7, which will be described in further detail in the examples below. If the customer does not have all of the documents used for the selected transaction (step 640: N), the computing device may follow reference 'D' and proceed to step 510 to determine whether the timeframe to receive missing documents has expired. Additionally (e.g., in parallel with the steps illustrated in FIG. 5) or alternatively, the computing device may return to step 610 and/or step 615 to wait for the next time the customer is scheduled to visit or does visit a location of the institution if not all of the missing documents have been received. By anticipating when the customer will visit a location of the institution, the customer can conveniently provide missing documents to the institution, without the customer having to make a separate trip to the institution to provide the documents.

Figure 7:
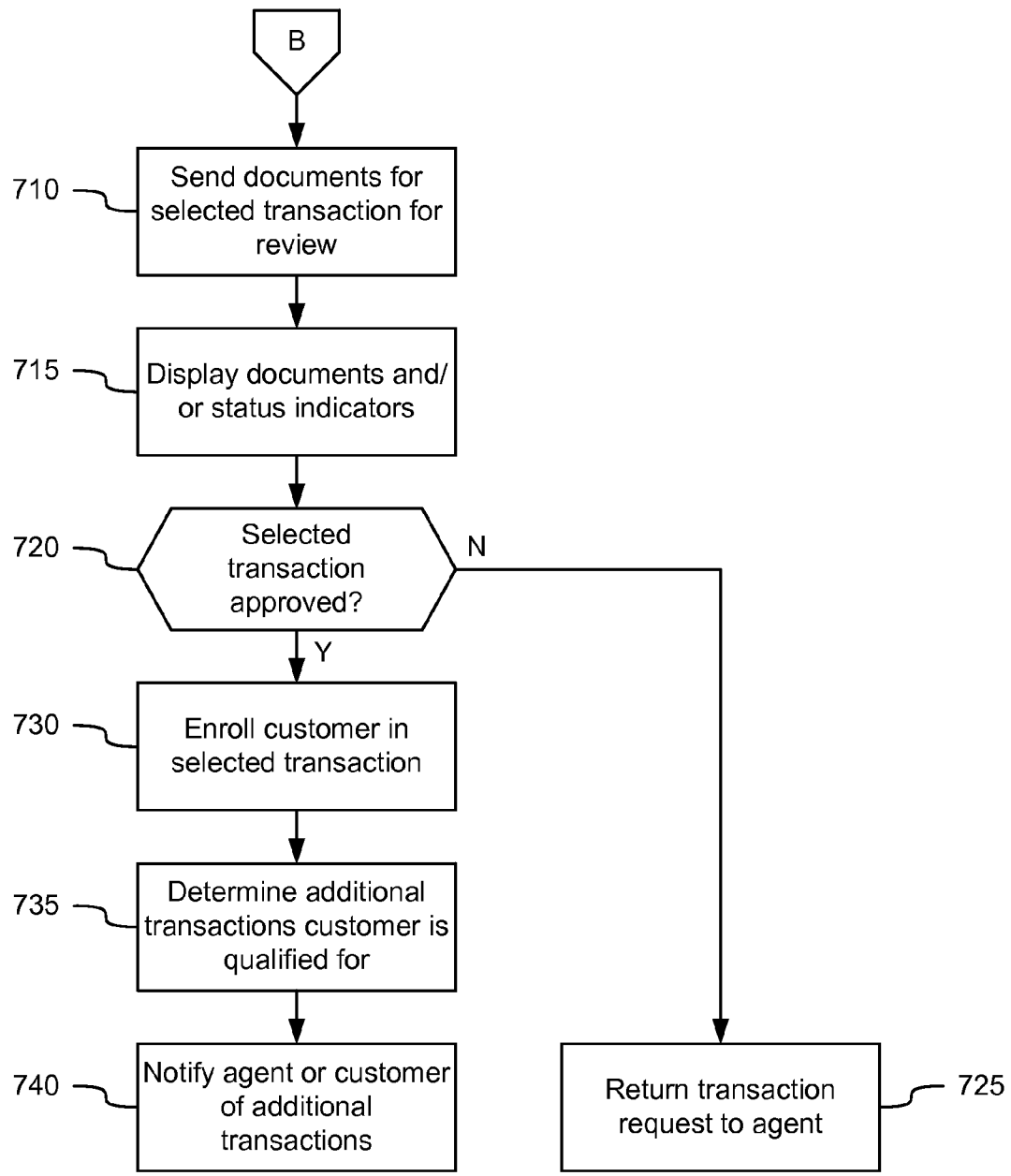
FIG. 7 illustrates an example of at least a portion of a flow diagram for enrolling a customer in a product or service if all documents have been received in which various aspects of the disclosure may be implemented.

FIG. 7 illustrates an example of at least a portion of a flow diagram for enrolling a customer in a product or service if all documents have been received in which various aspects of the disclosure may be implemented. The steps illustrated in the flow diagram may be performed by, for example, one or more computing device 101.

In step 710, when all documents used for the service selected by the user have been received (or an equivalent exists, or a requirement has been overridden, or another exception exists), the computing device may send the service enrollment request and/or the corresponding documents (e.g., in electronic format or physical copy format) for review. For example, the request or documents may be sent to a workstation of a second agent (e.g., a manager of the first agent, a branch manager, an administrator, a super user, or any other agent). In some aspects, the service enrollment request may be sent for review even if the request is incomplete (e.g., missing document(s), missing signature(s), and the like). For example, the request may be sent to the second agent, and the second agent may have the option to override the missing document, as previously discussed. The request may also be sent for review when the one of the timers previously discussed expires. For example, the request and/or documents may be sent to the second agent after the service enrollment request has been pending for 30 days, even if one or more documents are missing.

In step 715, the computing device may cause an instruction to be sent for the workstation of the second agent to display the documents and/or links to open the documents on the workstation. The user interface displayed to the second agent may also display metadata, such as status indicators for each of the documents. The user interface may also indicate which documents, if any, the customer is still missing and/or display an option for the second agent to override the missing document. The user interface presented to the second agent may be similar to or the same as the user interface presented to the first agent, as previously discussed.

In step 720, the computing device may determine whether the selected service or product has been approved by the second agent. For example, the user interface may display an "approve" (or equivalent) button, and the computing device may determine that the request and/or documents have been approved (step 720: Y) after the second agent selects the "approve" button. On the other hand, if the second agent selects a "do not approve" or "reject" (or equivalent) button, the computing device may determine that the request has not been approved (step 720: N) and proceed to perform step 725.

In step 725, the computing device may return the transaction request to the first agent with an indication that the second agent did not approve the request. Additionally or alternatively, the enrollment request may be cancelled, as was previously discussed with respect to step 515. Additionally or alternatively, the customer may be notified (e.g., via e-mail, telephone call, or other means) that the enrollment request was not approved. The first agent and/or the customer may be given additional time from disapproval to provide the missing documents (e.g., an extra 10 days or an extra 30 days). Additionally or alternatively, the enrollment request may be approved for a predetermined period of time with a beginning and ending effective date defined. In some aspects, the predetermined period of time may be the same as the amount of additional time the customer is given to provide missing documents (e.g., 10 days or 30 days). After the end of the predetermined time period, the enrollment request and/or the temporary service may be cancelled if the customer has not provided the missing documents.

On the other hand, if the transaction is approved in step 720, the computing device may enroll the customer in the selected transaction in step 730. In one example, the service or product that the customer has been enrolled in may comprise a financial investment advisor program. The computing device may set PS Base Eligibility to Eligible after all approvals are complete, Set PS Portfolio Manager Eligibility to Eligible after all approvals are complete, Set custom strategy to active after all approvals are complete, and/or Set FA Pool to active after all approvals are complete. Furthermore, the computing device may set a work order status for the product or service to complete. For example, the computing device may set an approval request status to complete when the account status is set to enrolled, set an approval request status to complete when all approvals are complete, set an approval request status to complete after the new selected investment is set, set a work order status to complete after all child approval requests are complete, set an approval request status to complete when all approvals are complete, set an approval request status to complete after recurring withdrawal changes are set, set a work order status to complete after a portfolio manager eligibility is set, set a work order status to complete after a base eligibility is set, and/or set a work order status to complete after an investment pool is activated.

In some aspects, approval by the first agent and/or the second agent may be optional. For example, a first set of services or products might be automatically approved once the customer provides all documents for the first set of services or products. A second set of services or products might be approved once the customer provides all documents and the first agent approves the request. A third set of services or products might be approved once the customer provides all documents, the first agent approves the request, and the second agent approves the request. Additional levels of review and/or approval may be added based on the type of service or product offered, based on the customer type (e.g., trusted and/or regular customer or not), and based on any other information.

In some aspects, the computing device may activate the product or service once the customer is enrolled in the product or service. In other aspects, the computing device may wait to activate the product or service until more than one customer is enrolled in the product or service, such as if the product or service comprises a portfolio group of customers (e.g., a group of 4 or 5 customers or accounts). In the portfolio group example, the computing device may wait for all customers in the same portfolio group to be enrolled in the product or service before the product or service is activated. If the timer for receiving documents previously discussed expires, the product or service may be activated for enrolled members of the portfolio group. Alternatively, the product or service may be activated once the first customer is enrolled, or once the second customer is enrolled, or once the third customer is enrolled, and so on (e.g., based on a threshold number of enrollees).

In step 735, the computing device may determine whether the customer qualifies (e.g., pre-qualifies) for any additional transactions (products or services) based on the documents on file for the customer, which the customer may have provided to enroll in the second product or service. The additional transactions may be different from the transaction that the customer has been approved for. For example, the customer may have Document A, Document B, Document C, Document D, and Document E on file. As previously discussed, the computing device may enroll the customer for a second service, which uses Document A, Document B, Document D, and Document E. However, because the customer also has Document A, Document C, and Document E on file, the customer may be qualified for a first service, even if the customer (or an agent on behalf of the customer) did not originally request to enroll in the first service.

In step 740, the computing device may notify the agent and/or customer of the additional transactions (products or services, such as a financial service) that the customer is qualified for, such as the first service previously discussed. For example (and as discussed above), a dashboard notice, an e-mail, a telephone call, or other methods may be used to notify the agent and/or customer that the customer is qualified for the additional service or product. Thus, the customer may conveniently request to enroll in other products and services with the institution. In some aspects, the customer might not have to receive approval (by the first agent and/or the second agent) for the first service. Instead, the customer might be pre-approved based on the documents on file and/or a previous enrollment request.

In some aspects, a user of the software toolkit, such as an agent, may have on-demand access to customer information, information on the status of enrollment requests, a list of documents used for a particular enrollment request, a list of documents on file and/or missing for the customer, the time that the request was submitted or that documents were submitted, the deadline to submit documents, and/or copies of the documents themselves, among other information. The user may open the software toolkit that tracks this information for current and future customers and view a corresponding user interface displaying the information. For example, the user interface may display a "Generate Documents" or a "Print Paperwork" option (or equivalent). Thus, the user can access the information described herein in real-time.

Furthermore, the user may have the option to summarize missing documents as well as print or send missing documents to customers on-demand. For example, the user interface may display a "Final Review" (or equivalent) option. When the "Final Review" option is selected, the computing device may generate a summary of missing documents, generate (e.g., print and/or display) missing documents, and/or send missing documents to the customer. An example of the "Final Review" Option is illustrated in FIG. 9.

In some aspects, the documents and/or signatures used for a particular service may change or otherwise be updated. For example, a third service may use Document A and Document B when the customer enrolls for the third service. At a future time, the third service may use Document A, Document B, and Document C. If the customer already has Document C on file, the computing device might not need to perform any additional actions. On the hand, if the customer does not have Document C, the computing device may notify the agent and/or customer that the customer should provide Document C to the institution. Thus, for example, the computing device may perform one or more of the steps described herein, such as starting from step 410 to determine whether documents for the customer are missing.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving a request to enroll a user in a product or service provided by an institution;
   determining, by a computing device, a first document used for the product or service;
   determining, by the computing device, whether the user has the first document used for the product or service on file with the institution;
   in response to determining that the user does not have the first document used for the product or service on file with the institution, generating a status identifier for the first document, wherein the status identifier indicates that the user is missing the first document;
   comparing a second document on file for the user to the first document;
   based on the comparing, determining that the second document is equivalent to the first document;
   determining whether the second document is valid by automatically analyzing, using image recognition, a signature contained within the second document, wherein using image recognition comprises determining that the signature contained within the second document matches a trusted signature associated with the user;
   in response to determining that the second document is equivalent to the first document and that the second document is valid, changing the status identifier for the first document to indicate that the user has the first document on file;
   receiving, by the computing device and from an electronic calendar, data indicating that the user will be at a location associated with the institution at a particular time;
   based on the received data, determining, by the computing device, that the user is at the institution at the particular time; and
   in response to determining that the user is at the institution, transmitting, by the computing device and to a second computing device at the location associated with the institution, a third document used for the product or service, wherein the user does not have the third document on file with the institution.

2. The method of claim 1, further comprising:
   determining the third document used for the product or service;
   determining whether the user has the third document used for the product or service on file with the institution; and
   in response to determining that the user does not have the third document used for the product or service on file with the institution, generating a second status identifier for the third document indicating that the user does not have the third document.

3. The method of claim 1, further comprising:
   generating a display indicating that the user is missing the first document and an option to send the first document to the user; and
   in response to receiving a selection of the option to send the first document to the user, sending the first document to the user.

4. The method of claim 1, further comprising:
   after generating the status identifier for the first document, receiving the first document from the user or an agent of the institution; and
   in response to receiving the first document, changing the status identifier for the first document to indicate that the user has the first document on file.

5. The method of claim 1, wherein the product or service provided by the institution uses a plurality of documents including the first document and the third document, and wherein the method further comprises:
   determining that the user has the plurality of documents for the product or service on file with the institution; and
   in response to determining that the user has the plurality of documents for the product or service on file with the institution, enrolling the user in the product or service.

6. The method of claim 1, further comprising:
   determining that a time frame for the user to provide the third document used for the product or service has expired; and
   in response to determining that the time frame for the user to provide the third document has expired, cancelling the request to enroll the user in the product or service.

7. The method of claim 1, further comprising:
   determining the second document on file for the user with the institution;
   based on the determining the second document on file for the user with the institution, determining a second product or service that uses the second document; and
   generating an indication that the user is pre-qualified for the second product or service.

8. An apparatus, comprising:
   a processor; and
   memory storing computer-executable instructions that, when executed by the processor, cause the apparatus to:
      receive a request to enroll a user in a product or service provided by an institution;
      determine a first document used for the product or service;
      determine whether the user has the first document used for the product or service on file with the institution;
      in response to determining that the user does not have the first document used for the product or service on file with the institution, generate a status identifier for the first document, wherein the status identifier indicates that the user is missing the first document;
      compare a second document on file for the user to the first document;
      based on the comparison, determine that the second document is equivalent to the first document;

determine whether the second document is valid by automatically analyzing, using image recognition, a signature contained within the second document, wherein using image recognition comprises determining that the signature contained within the second document matches a trusted signature associated with the user;

in response to determining that the second document is equivalent to the first document and that the second document is valid, change the status identifier for the first document to indicate that the user has the first document on file;

receive, from an electronic calendar, data indicating that the user will be at a location associated with the institution at a particular time;

based on the received data, determine that the user is at the institution at the particular time; and in response to determining that the user is at the institution, transmit, to a second apparatus at the location associated with the institution, a third document used for the product or service, wherein the user does not have the third document on file with the institution.

9. The apparatus of claim 8, wherein the memory stores additional computer-executable instructions that, when executed by the processor, cause the apparatus to:
determine the third document used for the product or service;
determine whether the user has the third document used for the product or service on file with the institution; and
in response to determining that the user does not have the third document used for the product or service on file with the institution, generate a second status identifier for the third document indicating that the user does not have the third document.

10. The apparatus of claim 8, wherein the memory stores additional computer-executable instructions that, when executed by the processor, cause the apparatus to:
determine the second document on file for the user;
based on the determining the second document on file for the user with the institution, determine a second product or service that uses the second document; and
generate a recommendation for the user to enroll in the second product or service.

11. The apparatus of claim 8, wherein the memory stores additional computer-executable instructions that, when executed by the processor, cause the apparatus to:
generate a display indicating that the user is missing the first document and an option to send the first document to the user; and
in response to receiving a selection of the option to send the first document to the user, send the first document to the user.

12. The apparatus of claim 8, wherein the memory stores additional computer-executable instructions that, when executed by the processor, cause the apparatus to:
after generating the status identifier for the first document, receive the first document from the user or an agent of the institution; and
in response to receiving the first document, change the status identifier for the first document to indicate that the user has the first document on file.

13. The apparatus of claim 8, wherein the product or service provided by the institution uses a plurality of documents including the first document and the third document, and wherein the memory stores additional computer-executable instructions that, when executed by the processor, cause the apparatus to:
determine that the user has the plurality of documents for the first product or service on file with the institution; and
in response to determining that the user has the plurality of documents for the first product or service on file with the institution, enroll the user in the product or service.

14. The apparatus of claim 8, wherein the memory stores additional computer-executable instructions that, when executed by the processor, cause the apparatus to:
determine that a time frame for the user to provide the third document has expired; and
in response to determining that the time frame for the user to provide the third document has expired, cancel the request to enroll the user in the product or service.

15. A non-transitory computer-readable medium having instructions stored thereon that, when executed, cause a computing device to:
receive a request to enroll a user in a product or service provided by an institution;
determine a first document used for the product or service;
determine whether the user has the first document used for the product or service on file with the institution;
in response to determining that the user does not have the first document used for the product or service on file with the institution, generate a status identifier for the first document, wherein the status identifier indicates that the user is missing the first document;
compare a second document on file for the user to the first document;
based on the comparing, determine that the second document is equivalent to the first document;
determine whether the second document is valid by automatically analyzing, using image recognition, a signature contained within the second document, wherein using image recognition comprises determining that the signature contained within the second document matches a trusted signature associated with the user;
in response to determining that the second document is equivalent to the first document and that the second document is valid, change the status identifier for the first document to indicate that the user has the first document on file;
receive, from an electronic calendar, data indicating that the user will be at a location associated with the institution at a particular time;
based on the received data, determine that the user is at the institution at the particular time; and
in response to determining that the user is at the institution, transmit, to a second computing device at the location associated with the institution, a third document used for the product or service, wherein the user does not have the third document on file with the institution.

16. The non-transitory computer-readable medium of claim 15 having additional computer-readable instructions stored thereon that, when executed, cause the computing device to:
determine the third document used for the product or service;
determine whether the user has the third document used for the product or service on file with the institution; and in response to determining that the user does not have the third document used for the product or service on file with the institution, generate a second status identifier for the third document indicating that the user does not have the third document.

17. The non-transitory computer-readable medium of claim 15 having additional computer-readable instructions stored thereon that, when executed, cause the computing device to:

generate a display indicating that the user is missing the first document and an option to send the first document to the user; and in response to receiving a selection of the option to send the first document to the user, send the first document to the user.

18. The non-transitory computer-readable medium of claim 15, wherein determining whether the second document is valid further comprises:

determining an identifier associated with the second document; and determining that the identifier associated with the second document is equivalent to an identifier associated with the user.

19. The non-transitory computer-readable medium of claim 15, having additional computer-readable instructions stored thereon that, when executed, cause the computing device to:

determine one or more additional documents used for the product or service;

determine that the user does not have the one or more additional documents used for the product or service on file with the institution;

determine that the user is categorized as a trusted customer; and in response to determining that the user is categorized as a trusted customer, enroll the user in the product or service.

20. The method of claim 1, further comprising:

comparing a fourth document on file for the user to the first document, wherein determining that the second document is equivalent to the first document comprises determining, based on the comparing the second document to the first document and based on the comparing the fourth document to the first document, that the second document comprises a first subpart of the first document and that the fourth document comprises a second subpart of the first document.

* * * * *